United States Patent [19]

Seibert et al.

[11] Patent Number: 4,457,667
[45] Date of Patent: Jul. 3, 1984

[54] VISCOUS DAMPER WITH ROTOR CENTERING MEANS

[75] Inventors: Willard J. Seibert, Manchester, Conn.; Wesley B. Hill, Marco Island, Fla.

[73] Assignee: United Technologies Corporation, Hartford, Conn.

[21] Appl. No.: 441,894

[22] Filed: Nov. 15, 1982

Related U.S. Application Data

[63] Continuation-in-part of Ser. No. 215,302, Dec. 11, 1980, abandoned.

[51] Int. Cl.³ ............................................. F04D 29/04
[52] U.S. Cl. ................................ 415/174; 308/184 R; 384/99

[58] Field of Search ................... 415/174, 113, 173 R; 384/99; 308/184 R, 207 R, 207 A, 189 R

[56] References Cited

U.S. PATENT DOCUMENTS

| | | | |
|---|---|---|---|
| Re. 30,210 | 2/1980 | Buono et al. | 308/184 |
| 3,756,672 | 9/1973 | Hibner et al. | |
| 3,908,361 | 9/1975 | Gardiner | 415/113 |
| 3,915,521 | 10/1975 | Young | 308/187 |

Primary Examiner—Lenard A. Footland
Attorney, Agent, or Firm—Norman Friedland

[57] ABSTRACT

This invention relates to means for preventing the gap adjacent the tips of the blades of a rotor in a turbine type power plant from increasing as a result of rotor sag occasioned when an oil damped bearing is utilized.

2 Claims, 3 Drawing Figures

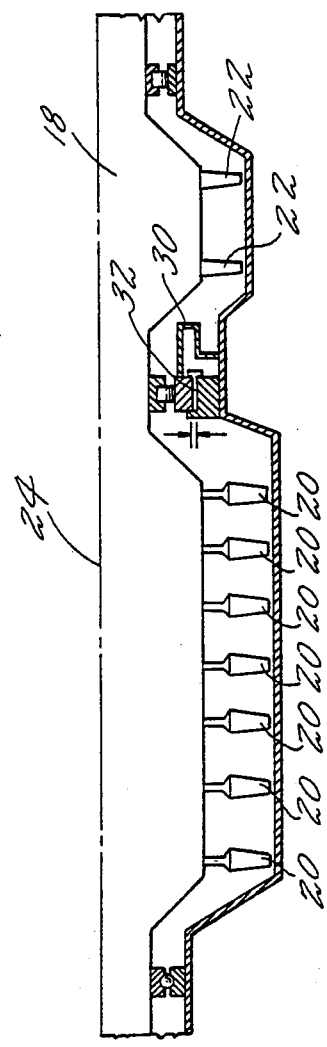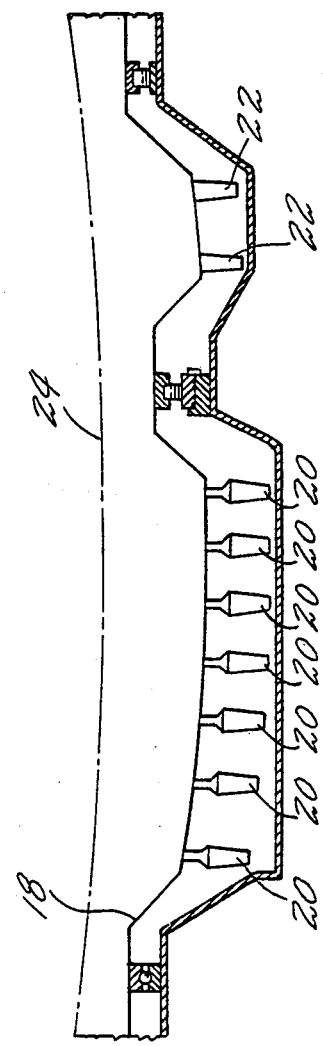

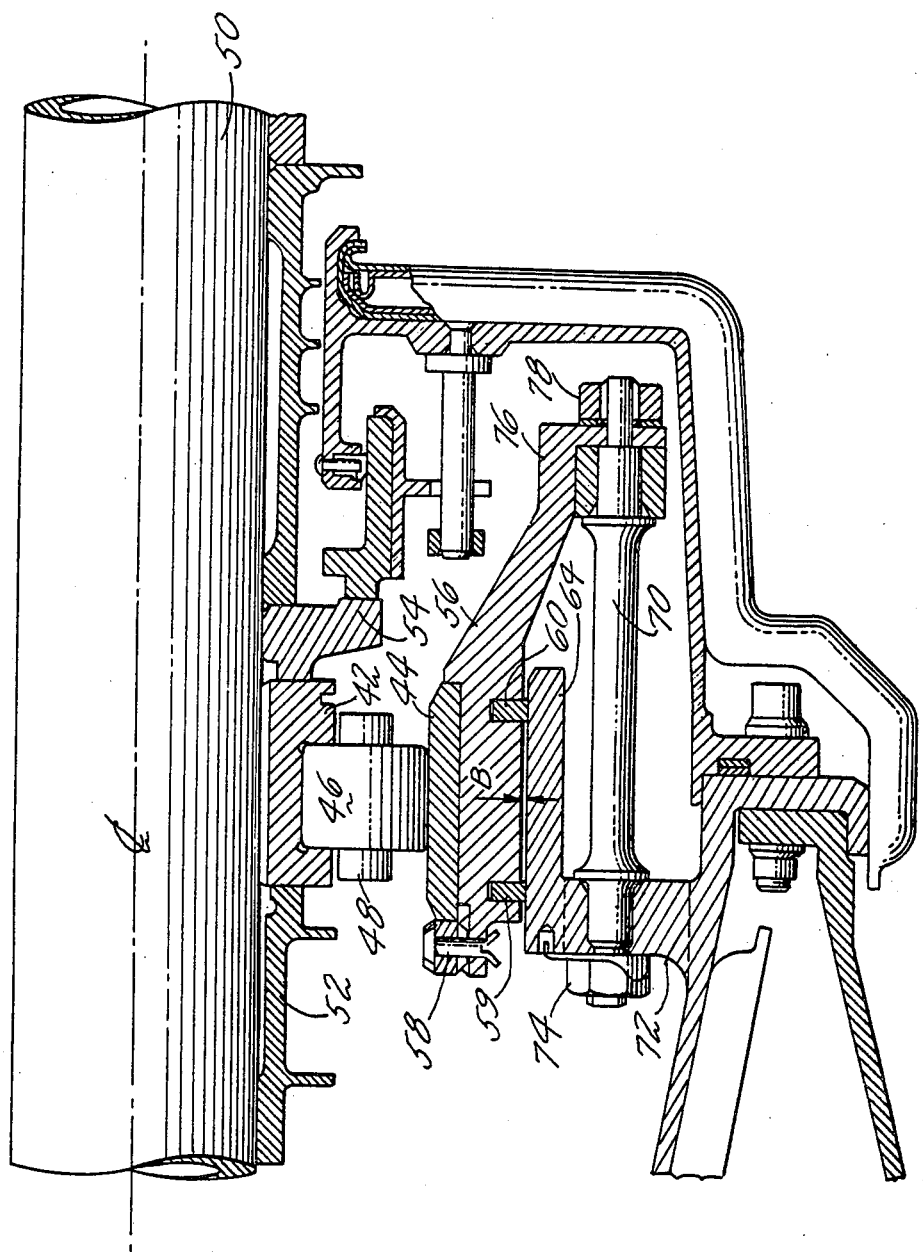

VISCOUS DAMPER WITH ROTOR CENTERING MEANS

CROSS REFERENCE TO RELATED APPLICATION

This is a continuation-in-part of application Ser. No. 215,302, filed on Dec. 11, 1980, now abandoned.

DESCRIPTION

1. Technical Field

This invention relates to twin spool engine and particularly to viscous damped bearings.

2. Background Art

As is well known, it is common practice to support the high speed shaft of a twin-spool gas turbine engine with oil damped radial bearings. It is also generally known that one can change the natural frequency of the rotating pressure field as to avoid instability that comes about due to uncontrollable vibration by spring loading the viscous damper. Reissue Pat. No. 30,210 given to D. F. Buono, N. G. Carlson, D. H. Hibner and D. C. Moringiello on Feb. 12, 1980 and assigned to the same assignee as this patent application, exemplifies such a system, where a spring is mounted parallel to the viscous damper. This changes the natural frequency of the pressure field.

We have found that use of viscous dampers in a high speed twin spool engine inherently affects the tip clearance of the rotor. This is a result of the rotor sagging within the clearance provided by the oil film. Obviously, the increased gap allows an excessive amount of air leakage between the tip of the rotor blade and its adjacent seal resulting in a gain of thrust specific fuel consumption (TSFC). To avoid this gain in TSFC we provide a centering spring to maintain the concentric clearance of the rotor which avoids the majority of the sag. The spring rate of this system is selected so that it provides maximum support for the rotor weight, for given "G" and gyro loads, while maintaining sufficient flexibility to allow oil film damping under conditions of high rotor imbalance.

DISCLOSURE OF INVENTION

An object of this invention is to provide a method of preventing rotor sag for a twin spool engine that employs viscous damped bearings.

A feature of the invention is to utilize a centering spring for the viscous damped bearing so that the bearing rotor of the shaft does not bottom against the bottom wall of the reservoir of the viscous damper during aircraft maneuvers. The spring rate of the centering spring is optimized so as to minimize for rotor to case relative motion while maintaining the required amount of motion within the viscous damper.

Other features and advantages will be apparent from the specification and claims and from the accompanying drawings which illustrate an embodiment of the invention.

BRIEF DESCRIPTION OF DRAWINGS

FIG. 1 is a partial schematic of the rotor and support system without the inclusion of this invention.

FIG. 2 is a partial schematic identical to FIG. 1 and showing the damped bearing with the present invention.

FIG. 3 is a partial view partly in schematic and partly in section showing the details of the invention.

BEST MODE FOR CARRYING OUT THE INVENTION

While this invention is described in its preferred embodiment with a rotor/shaft for a twin spool gas turbine engine being supported by three bearings, it is to be understood that the scope of the invention is not limited thereto.

To best understand this invention reference is made to FIG. 1 which shows the rotor generally illustrated by reference numeral 10 being supported by three bearings. Bearings 12 and 14 are radial load bearings and bearing 16 is the thrust load bearing. The particular bearings are well known and for further details reference is hereby made to the models JT9D and JT10D manufactured by Pratt & Whitney Aircraft Group of United Technologies Corporation, the assignee of this patent application.

As can be seen in FIG. 1, the rotor sags because its weight causes it to seat on the bottom of the viscous damper wall. The amount of sag is related to the displacement of the bearing relative to the oil damp gap which occurs when the rotor is subject to gravitation or gyroscopic loading. In that instance the weight and inertia of the rotor, that is, shaft 18, stages of compressor blades 20 and stages of turbine blades 22 force the shaft to distort as shown by the bow of center line 24.

FIG. 2 represents the same rotor system when employing the present invention. The centering spring 30 suitably supports the bearing so that the gap of the oil damper 32 remains substantially undisturbed when the rotor is subject to aircraft maneuvers.

As is apparent from the foregoing, the viscous damped bearing is located intermediate the compressor and turbine. This is not to be construed as a necessary aspect of this invention, as one ordinarily skilled in the art will recognize that the damped bearing can be located in other locations and more than one bearing may be damped.

Hence, by employing centering spring 30, the annular gap defined by the oil reservoir 32 assures that the gap "A" remains substantially the same when the engine is in the static condition. In actual test it was found that the gap allowance could be reduced from 0.005 inch to 0.001 inch which represents a considerable benefit in TSFC.

Details of a preferred embodiment of a viscous damped bearing centered by a centering spring is shown in FIG. 1. As can be seen the roller bearing generally illustrated by reference numeral 40 comprises inner race 42, outer race 44, sandwiching a plurality of rollers 46 (one being shown) retained in its relative positions by cage 48. The inner race 42 is supported to shaft 50 by the end locking members 52 and 54. The outer race 44 is secured into position and supported to ring element 56 by lock nut and rivet assembly 58. The viscous damper is obtained by sealing the ends of support ring 56 with the annular seals 58 and 60 which project beyond the outer surface 62 of support ring 56 and bear against the inner diameter of annular ring 64. Note that the bearing assembly is not supported by the seals 58 but rather are supported by cantilever spring 70. Hence, the bearing is centered by the centering spring which comprises a plurality of cantilevered springs 70 (one being shown). As noted, one end of spring 70 is secured to the bulkhead or casing support member 72 by the nut assembly 74 and the other end is secured to the extension portion 76 of ring element 56 by nut assembly 78.

As is apparent from the foregoing, the centering spring 70 serves to maintain the gap "B" in the oil damper. It is obvious that the centering spring can be made more effective in terms of supporting the rotor as being designed for increased stiffness. However, this would result in reduced motion within the viscous damper under conditions of rotor imbalance (whirl) loads. Thus the support spring rate must be optimized for the two conflicting requirements. The spring rate is calculated in accordance with the formula $$\frac{P}{\Delta} = \frac{12EiN}{L^3}$$

where:
P = load
$\Delta$ = deflection
E = modulus of elasticity
i = bending moment of inertia
L = length of each rod of the spring
N = number of rods.

It should be understood that the invention is not limited to the particular embodiments shown and described herein, but that various changes and modifications may be made without departing from the spirit and scope of this novel concept as defined by the following claims.

I claim:

1. For turbine type power plant having a given thrust specific fuel consumption and having a rotor enclosed in a casing having a rotatable shaft supporting a plurality of compressor blades at one end and a plurality of turbine blades at an opposite end, at least three bearings axially spaced along said shaft for rotatably supporting said shaft and one of said bearings mounted intermediate said compressor blades and said turbine blades and the other two bearings, fluid damper means on said one of said bearings including a cavity adjacent said one bearing in which fluid is fed to support said bearing when in the rotating mode, said shaft being distortable as a function of the depth of said cavity and radially displacing said compressor blades a similar amount, the tips of said blades being sufficiently spaced to prevent touching of the inner diameter of said casing, means for improving the thrust specific fuel consumption by decreasing the distance of displacement of the tips of said blades including a spring means attached to said damper of said one bearing for preventing said one bearing from displacing the depth of said cavity and said spring being attached to said casing.

2. For turbine type power plant having a given thrust specific fuel consumption and having a rotor enclosed in a casing having a rotatable shaft supporting a plurality of compressor blades at one end and a plurality of turbine blades at an opposite end, at least two bearings axially spaced along said shaft for rotatably supporting said shaft and one of said bearings mounted intermediate said compressor blades and said turbine blades, fluid damper means on one of said bearings including a cavity adjacent said one bearing in which fluid is fed to support said bearing when in the rotating mode, said shaft being distortable as a function of the depth of said cavity and radially displacing said compressor blades a similar amount, the tips of said blades being sufficiently spaced to prevent touching of the inner diameter of said casing, means for improving the thrust specific fuel consumption by decreasing the distance of displacement of the tips of said blades including a spring means attached to said one bearing for preventing said one bearing from displacing the depth of said cavity wherein the rate of said spring is selected to minimize the deflection of said rotor relative to load manifested thereon by acceleration and gyroscopic forces when the shaft accelerates to its steady state operating speed where said spring rate is calculated in accordance with the formula $$\frac{P}{\Delta} = \frac{12EiN}{L^3}$$

where:
P = load
$\Delta$ = deflection
E = modulus of elasticity
i = bending moment of inertia
L = length of each rod of the spring
N = number of rods.

* * * * *